Dec. 14, 1954 R. K. BEAN 2,696,752
STEREOSCOPIC PHOTOGRAPHIC PROJECTION MAPPING INSTRUMENT
Filed June 29, 1951 9 Sheets-Sheet 1

INVENTOR
RUSSELL K. BEAN
BY H. L. Godfrey
ATTORNEY

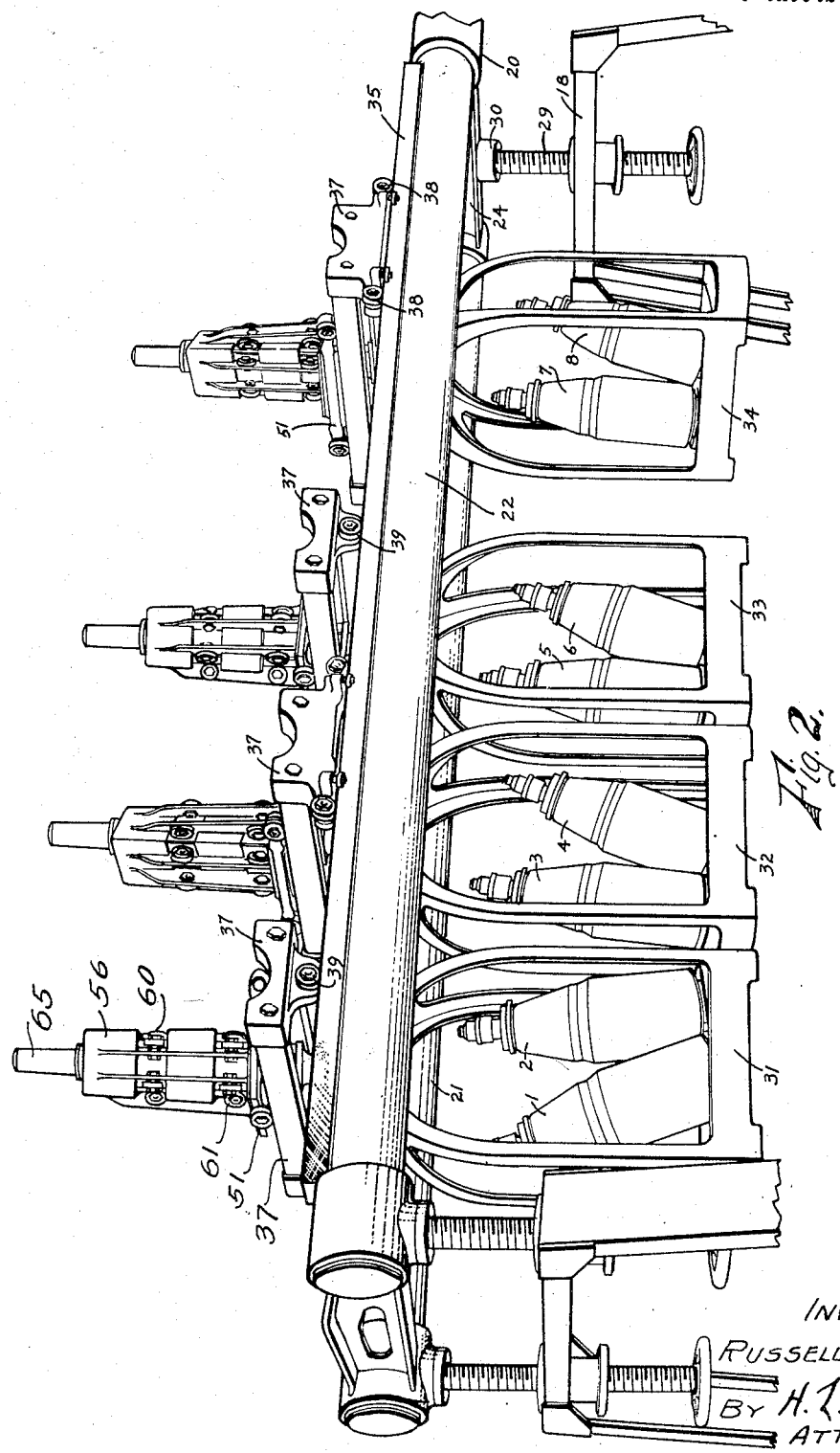

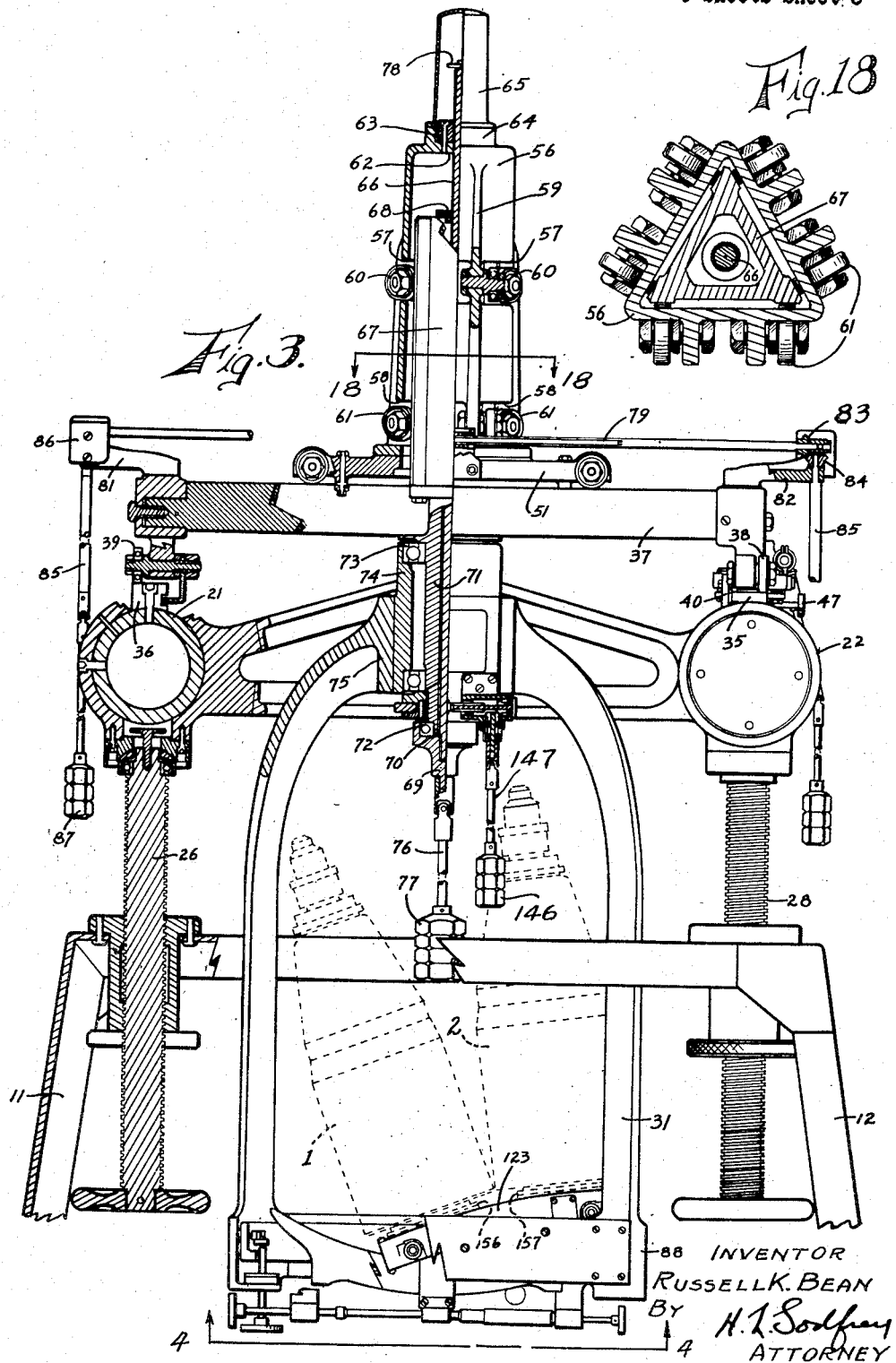

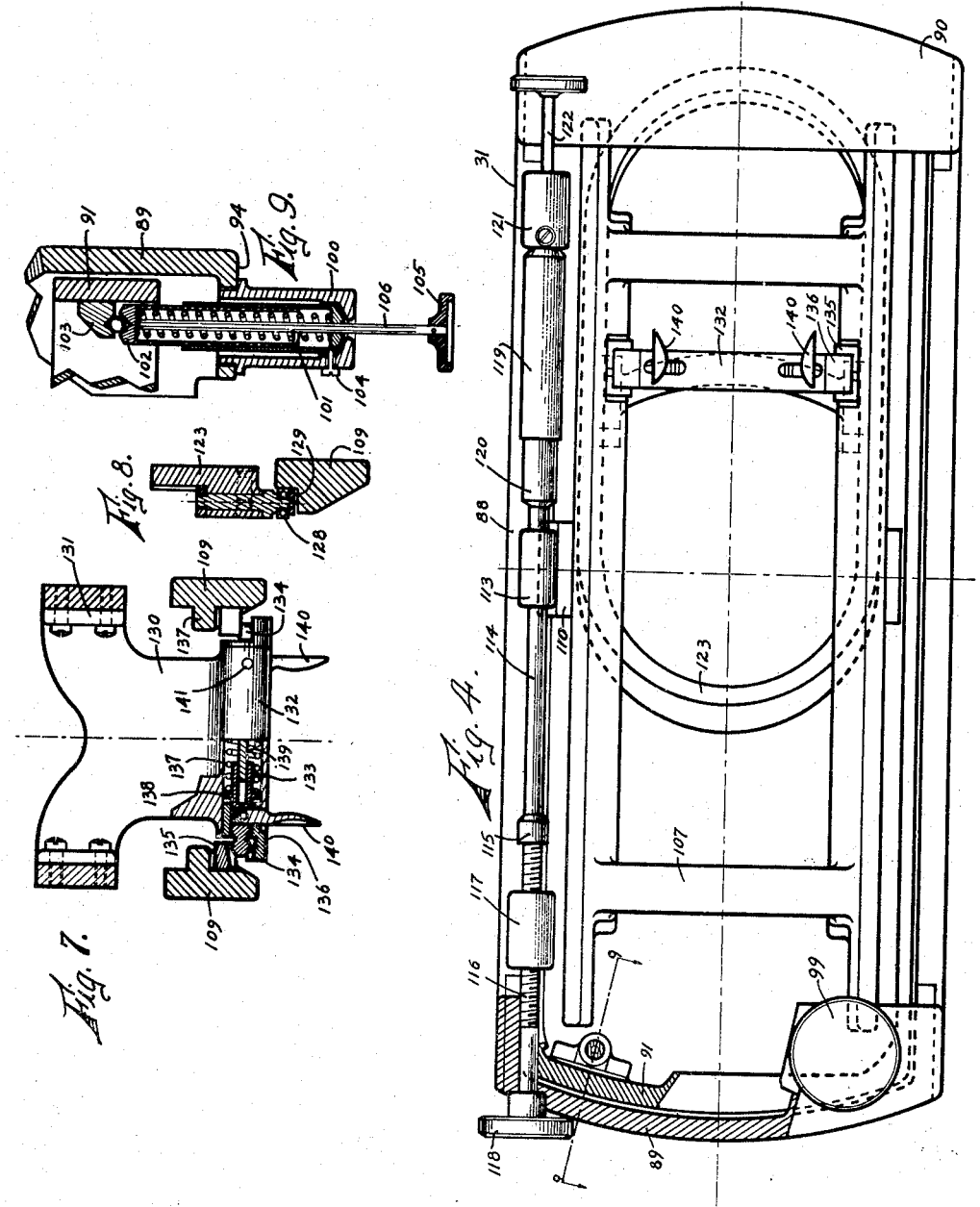

Dec. 14, 1954  R. K. BEAN  2,696,752
STEREOSCOPIC PHOTOGRAPHIC PROJECTION MAPPING INSTRUMENT
Filed June 29, 1951  9 Sheets-Sheet 5
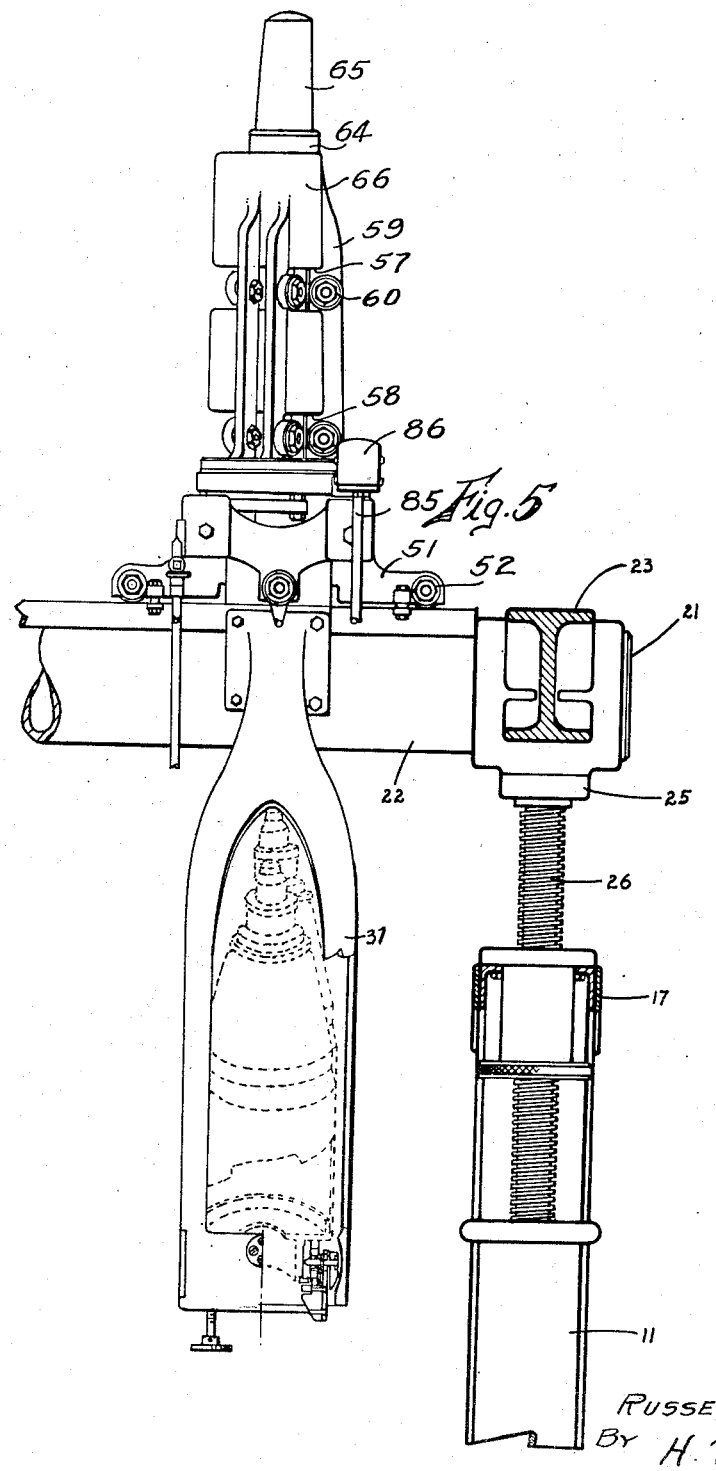
INVENTOR
RUSSELL K. BEAN
By H. L. Godfrey
ATTORNEY

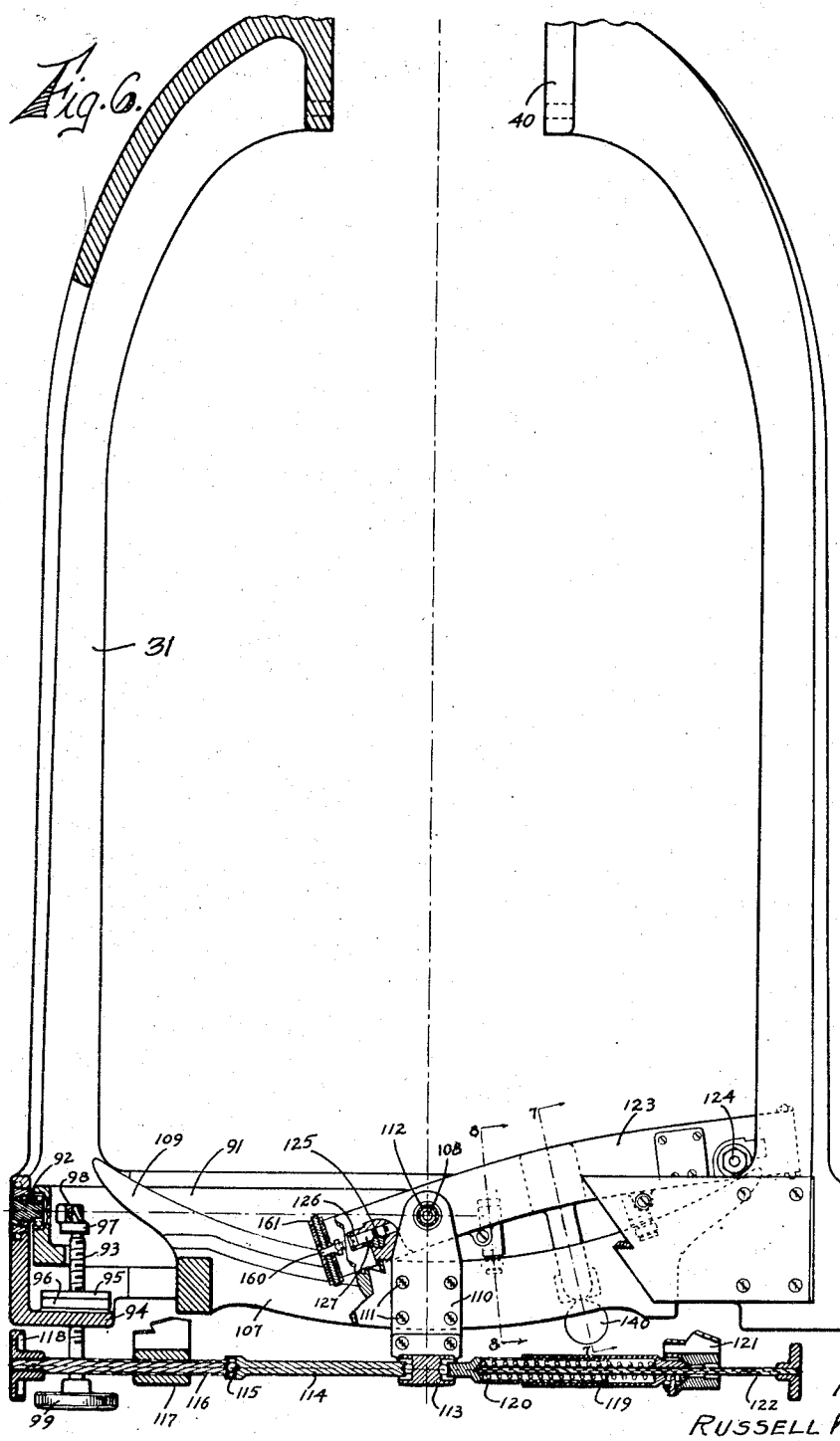

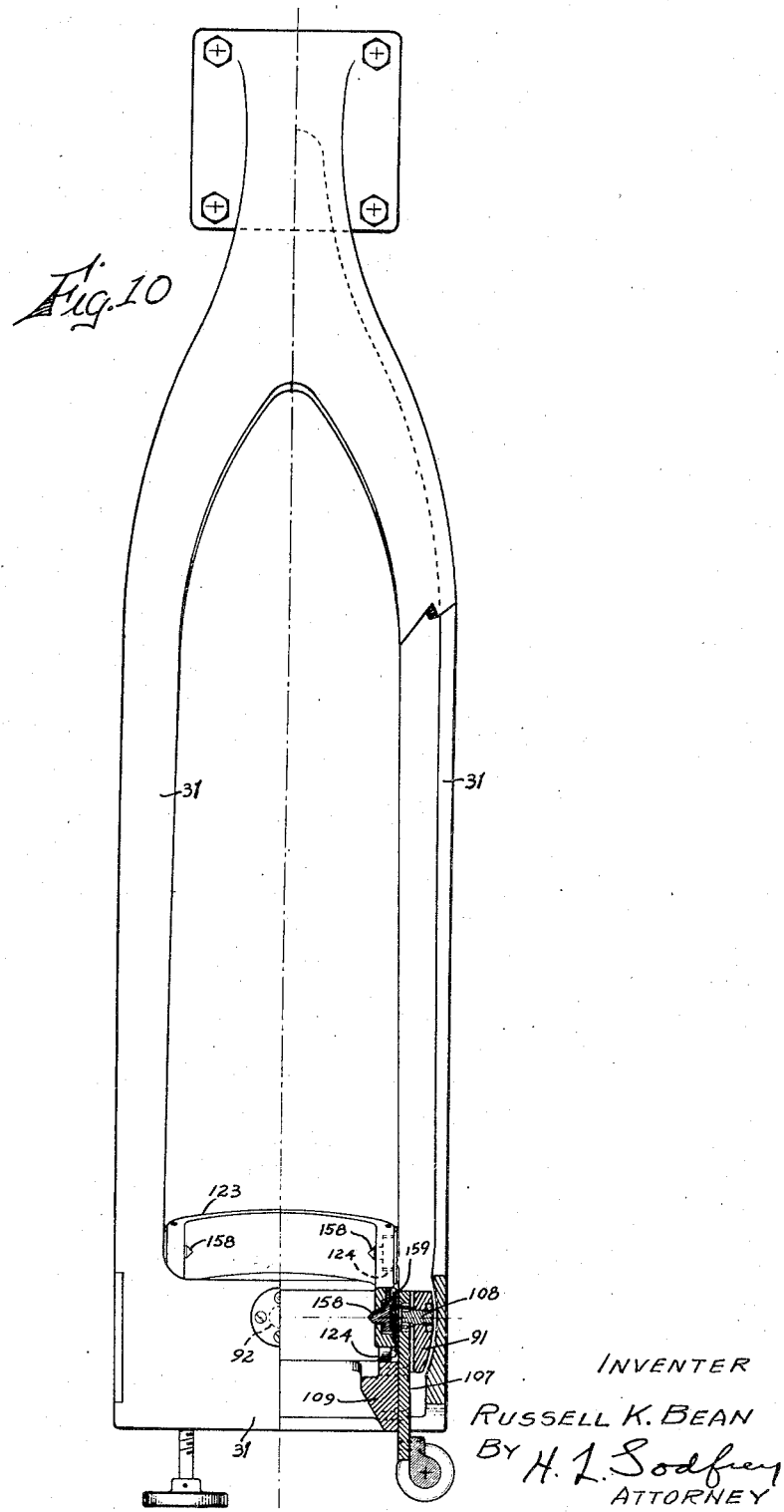

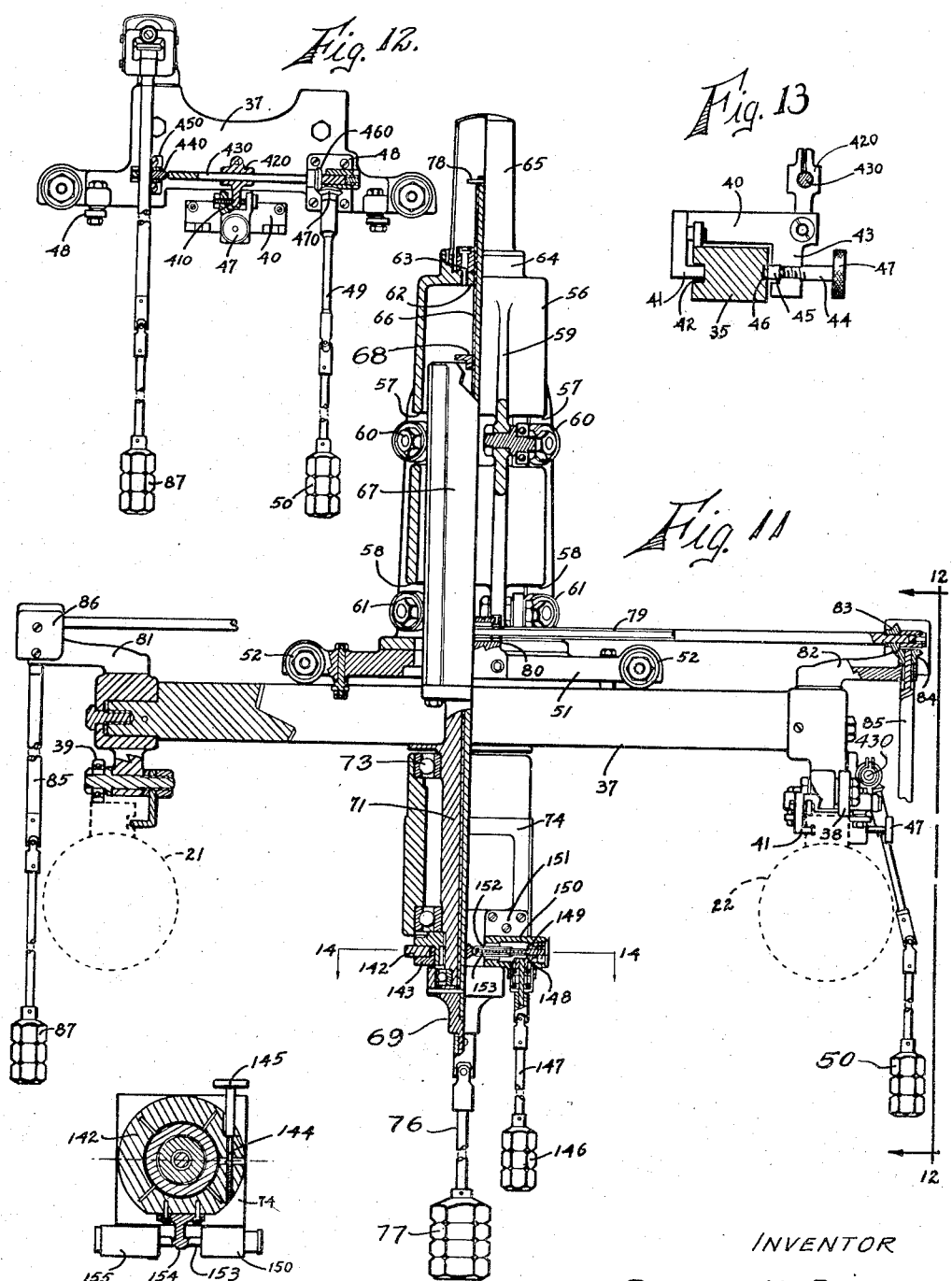

Dec. 14, 1954 R. K. BEAN 2,696,752
STEREOSCOPIC PHOTOGRAPHIC PROJECTION MAPPING INSTRUMENT
Filed June 29, 1951 9 Sheets-Sheet 9
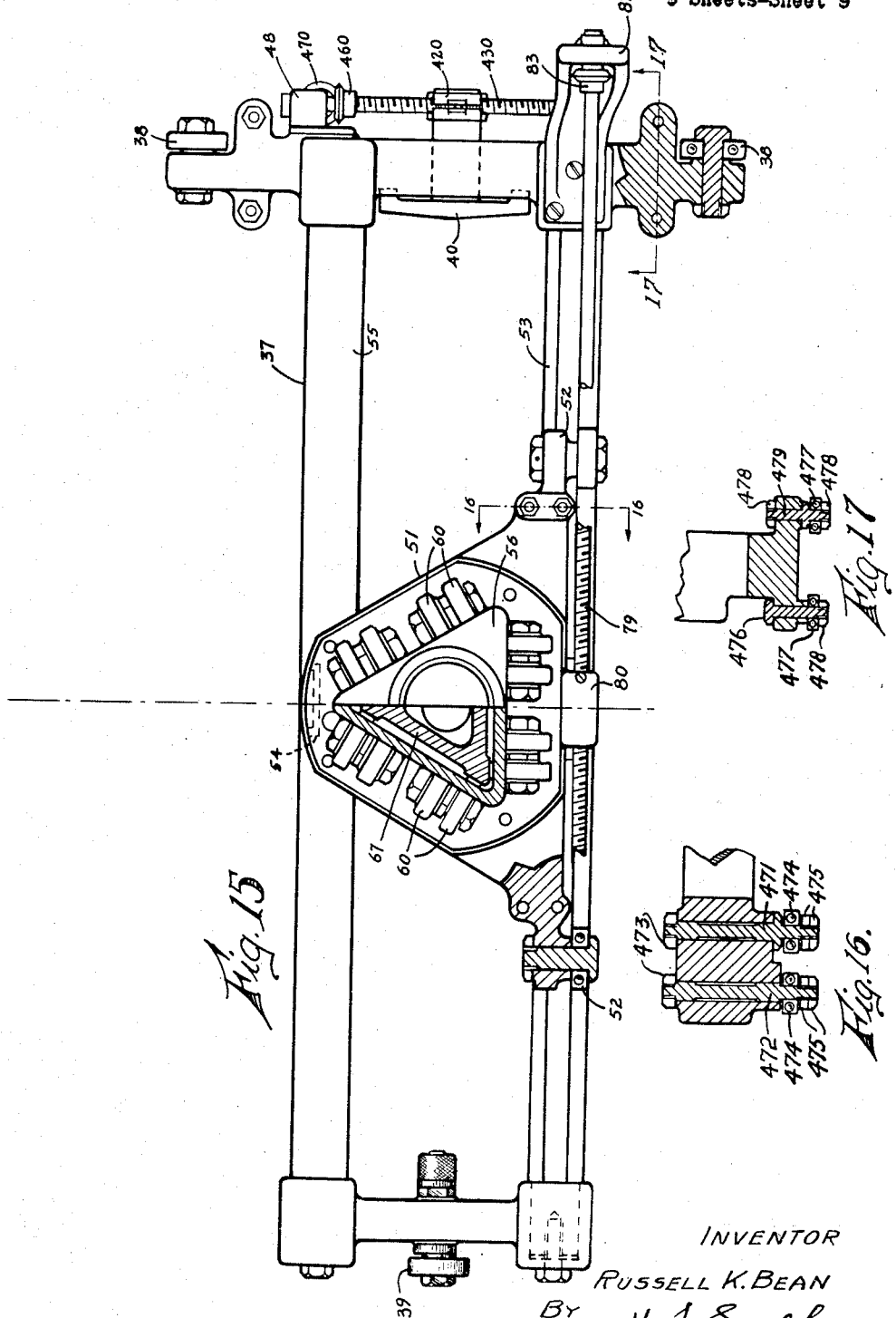
INVENTOR
RUSSELL K. BEAN
By H. L. Godfrey
ATTORNEY

United States Patent Office 2,696,752
Patented Dec. 14, 1954

2,696,752

STEREOSCOPIC PHOTOGRAPHIC PROJECTION MAPPING INSTRUMENT

Russell K. Bean, Arlington County, Va.

Application June 29, 1951, Serial No. 234,430

9 Claims. (Cl. 88—24)

(Granted under Title 35, U. S. Code (1952), sec. 266)

This invention relates to an instrument or machine for use in making maps from aerial photographs. In modern map making procedures, aerial photographs provide the basic data used in compiling the map. Instruments have previously been developed for delineation on a map of information contained on photographs. However, none of these has provided for convenient and efficient use of convergent low-oblique photography, although such photography has long been known as a means for obtaining economical and accurate maps. It is a principal object of the present invention to provide an instrument for efficiently exploiting the advantages of convergent low-oblique photography.

Another object of the invention is to provide a stereoscopic map making instrument by the use of which it is possible to cover a much greater ground area per stereoscopic model than with vertical photography and to increase the accuracy of the results.

Another object is the provision of an instrument of this character adaptable for use in connection with reconnaissance mapping as well as for precision mapping.

Another object is to provide a device of this kind in which extension of both horizontal and vertical control may be accomplished without auxiliary equipment.

Another object is the production of an instrument which utilizes double projections of coupled convergent low-oblique photography oriented either along the flight line or normal to it. The orientation is said to be along the flight line when the flight line and the optical axes of the cameras lie approximately in a common plane. The orientation is said to be normal to the flight line when the plane containing the optical axes of the cameras is approximately perpendicular to the flight line.

Another object is to provide a map making machine which is convenient and efficient in use and characterized by ease of operation.

Another object is to provide a stereoscopic map-making instrument which is self-calibrating in that it gives an overlap of 0.6 times the flight height in coverage between the two components of the coupled convergent low oblique cameras, said overlap affording an opportunity to recover the relative orientation of the coupled cameras in nature.

Another object is to provide a stereoscopic map-making instrument utilizing stereoscopic models in which the principal points of the overlapping photographs are projected in such a manner that their images are relatively close together in the model, resulting in an overlap of approximately 100% in ground coverage, this disposition taking advantage of Gruber's principle that with low convergent obliques the effect of distortion errors is only half as great as with vertical photographs.

Another object is to provide a stereoscopic map making instrument which makes possible more rigid space positioning of photographic exposure stations by virtue of the coverage of a larger ground area in relation to the flight height with convergent low-oblique photography than can be achieved with vertical photography.

Another object is to provide a device of this kind in which precise horizontal and vertical aerial triangulation may be accomplished without auxiliary equipment, whether the photography is oriented along the flight line or normal to it.

Another object is to provide a device of this kind in which the same set of projectors and projector mounts is used, whether the photography is oriented along the flight line or normal to it.

Initially it may be pointed out that heretofore the so-called "multiplex" system of projection has been commonly known. The present invention is based upon, but represents a marked advance over this system. The instrument of this invention comprises a linear series of projectors or lights in which diapositives are inserted in the order in which the respective photographs were taken. These diapositives, it may be noted, are glass plates upon which the positive photographic prints have been reproduced. Projection lights with filters suitable for stereoscopic viewing are then turned on, resulting in the projection of images common to each diapositive. The series of projectors, instead of being single units as in the conventional double projection instruments known as multiplex, consists of units each embodying twin projectors. The diapositives used in any one projector unit correspond respectively to the two exposures made at one camera station. These exposures do not constitute a stereoscopic model. Each exposure must be paired with an exposure of another unit embracing to some extent the same terrain from an adjacent camera station. Physical limitations prevent the simultaneous orientation of both projectors of a single unit, it being obvious that the projection lenses of both projectors of one unit cannot occupy the same location at the same time. Provision is made in accordance with the present invention, to allow each of the two projectors utilized to be brought, in turn, into position for forming a stereoscopic model with the appropriate projector of an adjacent projector unit. In either method of orientation of the taking camera, whether along the line of flight or normal to it, only one projector of each unit is in use at any one time, but the unit is so assembled and calibrated that once either of the projectors of a unit has been oriented, the other can be brought into orientation.

With reference to the drawings illustrating the invention:

Fig. 2 is an enlarged perspective view of the upper portions of the machine, with certain details omitted for clarity.

Fig. 3 is an end view of the portion of the machine illustrated in Fig. 2, with certain parts broken away and shown in cross section for the sake of disclosure.

Fig. 4 is a view, partly in cross section, on line 4—4 of Fig. 3.

Fig. 5 is a detail view, partly in cross section, disclosing elevating mechanism forming part of the machine.

Fig. 6 is a detail view, partly in cross section, of one of the projector supports or stirrups.

Figure 1:
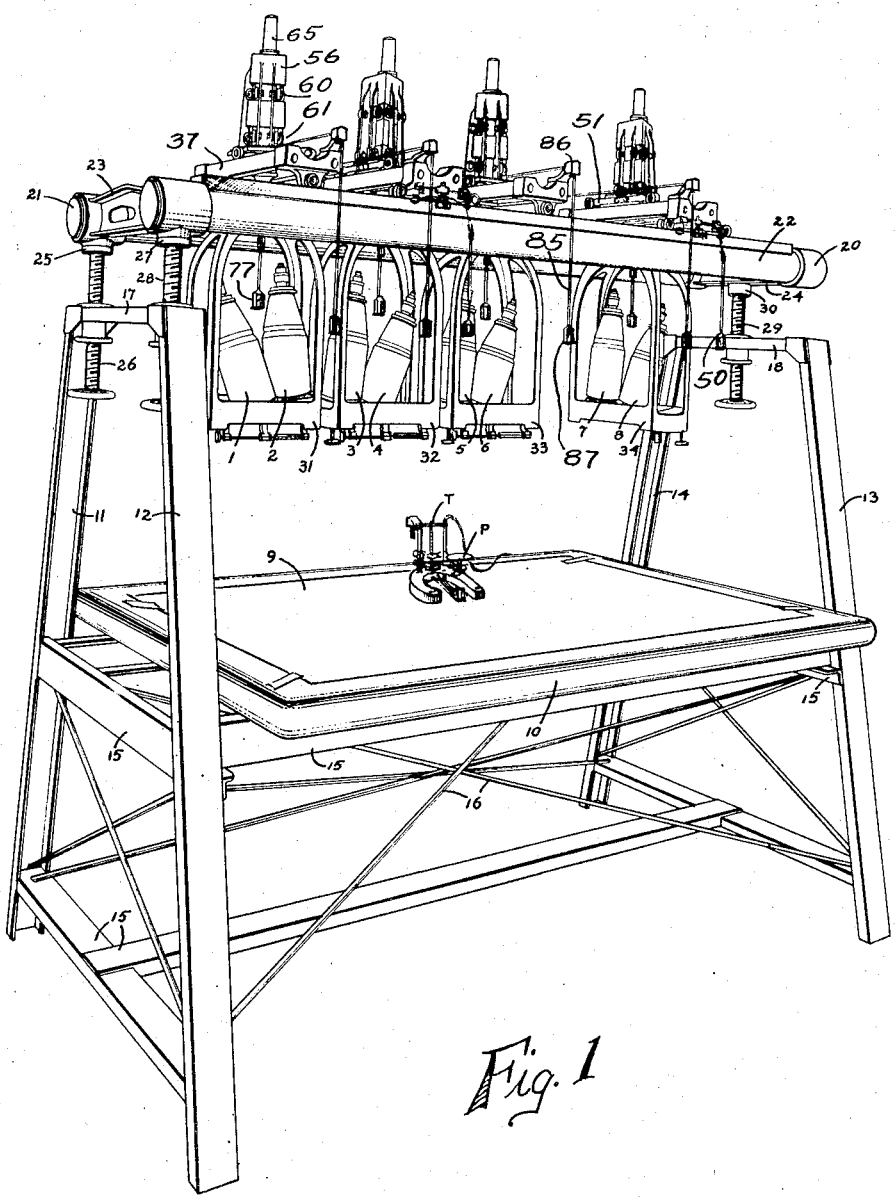
Fig. 1 is a perspective view of the stereoscopic instrument of this invention showing a map positioned thereon and a plotting device or table on the map, in position for use, certain details of the machine being omitted for the purpose of clarity.

Fig. 7 is a cross sectional view on line 7—7 of Fig. 6.
Fig. 8 is a cross sectional view on line 8—8 of Fig. 6.
Fig. 9 is a cross sectional view on line 9—9 of Fig. 4.
Fig. 10 is an end view, partly broken away and partly in cross section, of one of the projector supports or stirrups.

Fig. 11 is a detail view, partly broken away and partly in cross section, showing adjustment means utilized in modifying the position of the projector units.

Fig. 12 is a view taken substantially on line 12—12 of Fig. 11.

Fig. 13 is a detail cross sectional view through a clamp assembly used in the present invention.

Fig. 14 is a cross sectional view on line 14—14 of Fig. 11.

Fig. 15 is a top plan view, partly broken away and partly in section, showing the column-support for a projector unit and related structure.

Fig. 16 is a cross sectional view on line 16—16 of Fig. 15.

Fig. 17 is a cross sectional view on line 17—17 of Fig. 15; and

Fig. 18 is a cross sectional view on line 18—18 of Fig. 3.

By way of initial general description, it may be explained that each of the projector units, Nos. 1 through 8, inclusive, in Fig. 1, is adapted to project light rays onto a map 9 disposed on the worktable 10. The light rays from each projector which is of known construction, pass through an optical system therein comprising a red or blue filter, a condensing lens, or suitable reflecting surface, a glass diapositive of the photograph being projected, and a projection lens. This results in the projection of the image of the photograph, in a color corresponding to the color of the filter, on the map 9 and on the platen P of a plotting table or device T which can be moved over the map 9. With two correctly oriented photographs projected on the platen, one through a red filter and the other through a blue filter, the operator, with the aid of red and blue spectacles, sees a stereoscopic model. The plotting table T provides the means of delineating on the map 9, horizontal and vertical map data, the table T being guided by observation of the stereoscopic model. It may be noted that this plotting table is of the type commonly used with multiplex equipment. Polaroid filters and viewing spectacles, or variations of complementary color combinations, or a system of alternate intermittent lighting known as the "flicker" system, can be substituted for the red and blue color combination mentioned above, to obtain the stereoscopic effect.

For photography taken with the axis of the camera couple oriented along the flight line, stereoscopic models are formed when the projectors are paired as follows, assuming eight projectors all oriented along the flight line: 1–4; 3–6; 5–8.

For photography taken with the axis of the camera couple oriented normal to the flight line, stereoscopic models are formed when the projectors are paired as follows, assuming eight projectors all oriented normal to the flight line: 1–3; 3–5; 5–7; 2–4; 4–6; 6–8.

As further general description preceding a more detailed disclosure, it may be explained that each pair of convergent projectors is mounted on an arcuate track permitting alternate orientation of either one of the pair of projectors. Each track, in turn, is mounted in a cagelike supporting member or stirrup which is rotatable about a vertical axis so that each pair of projectors may be oriented either for photography along the flight line (as, for example, projector 6), or for photography normal to the flight line (as, for example, projector 8).

Each stirrup is suspended at the lower end of a column structure on which the stirrup is adjustable vertically, that is, in the "Z direction." For adjustment in the "Y direction" (that is, transversely to the line of flight), the entire vertical column, with stirrup attached, is mounted on a base movable along a supporting carriage. The latter is itself wheel-mounted on tracks extending longitudinally of the machine as a whole, whereby the projectors, in their stirrups, can be adjusted in the "X direction," i. e., along the line of flight. Provision is made for the rotation of each projector as a unit about the X, Y and Z axes. Provision is also made for locking the device in any of these adjusted positions so that the orientation of the taking camera in space, at the instant of exposure, can be recovered.

The tracks last mentioned are fixed to a double supporting bar or frame which is mounted on three vertically adjustable shafts, two at one end of the frame and one at the other end, whereby the frame may be selectively tilted.

With this general description in mind, it will now be possible to grasp more readily the following description of details of the invention.

Worktable 10 is supported by four standards, 11, 12, 13 and 14. The standards are rigidly connected by suitable lower bars 15 and ties 16. The standards 11 and 12 are further connected at the top by a cross bar 17, while standards 13 and 14 are connected at the top by a cross bar 18.

The double supporting bar or frame is indicated at 20 and is supported at the top of the machine. It consists of a pair of tubular side members 21 and 22 having connector 23 therebetween at one end and a connector 24 at the other end. The bar 21 comprises an end socket 25 for receiving the upper end of a threaded vertical shaft 26 extending upwardly through the cross bar 17 and adapted to be advanced or retracted for raising or lowering the bar 21. Similarly, the tubular member 22 comprises a socket 27 for receiving the threaded shaft 28, adapted to be moved up and down for similarly raising or lowering the tubular member 22.

At the other end of the frame 20, the latter is raised and lowered by means of a threaded shaft 29 projecting through the cross bar 18 and received at the upper end in a socket 30 provided on the cross bar 24.

The structural details just outlined provide, it will be noted, a three-point support for the frame 20 whereby certain tilting adjustments of the projector units may be achieved.

Projectors 1–2, 3–4, 5–6, 7–8 are carried in pairs in narrow cagelike supports or stirrups 31, 32, 33 and 34 (Figs. 2, 3, 6 and 10). A description of one of these and the means for supporting it in adjusted positions will suffice for all. Each of the tubular members 21 and 22 of the frame 20 has a rail 35 and 36, respectively, extending longitudinally thereof, upon which a carriage 37 is movable. This carriage is in the form of a casting having a pair of roller bearings 38 mounted on one side thereof and resting against the rail 35 and, on the other side, a single roller bearing 39 resting against the rail 36. In this connection reference is made to the carriage 37 at the right-hand end of Fig. 2 and to the structure seen in Figs. 3, 11 and 14. It will likewise be seen that the several carriages 37 are positioned, in alternation, one with its pair of bearings 38 on rail 35, and its single bearing 39 on rail 36, and the next carriage disposed in opposite fashion, thus permitting the carriages to nest closely so that the distance between camera stations can be at a minimum, while at the same time providing a stable support.

Means are provided for clamping the carriages to the rails in a desired position. This means is seen particularly in Figs. 11, 12 and 13 and comprises a clamp member 40 embracing the rail. The clamp includes a projecting lug 41 extending into a lateral groove 42 on the inner side of the rail and a front section 43 having a threaded bolt 44 extending therethrough and terminating in a shoe 45 slidably seated in a groove 46 extending longitudinally of the outer face of the rail. The outer end of the bolt 44 is provided with a thumb wheel 47 for advancing and retracting the belt and the shoe attached thereto.

The clamp member 40 has secured thereto, as at 410 (Fig. 12) an upwardly projecting nut 420 through which a threaded shaft 430 passes. At one end, the threaded shaft is engaged by a cone-pointed screw 440 projecting from a small casting 450 on the carriage 37. At the other end, the threaded shaft has thereon a beveled gear 460. This gear meshes with a companion beveled gear 470 mounted on a small casting 48 on a carriage 37.

It will now be seen that the clamp member 40 through the medium of the threaded shaft 430, attaches the carriage 37 to its rails. When the thumb wheel 47 is advanced, the shoe member 45 and the lug 41 (Fig. 13) are secured in their respective grooves to preclude substantial movement of the carriage 37. When a relatively minute movement of the carriage is desired, the threaded shaft 430 is turned in its nut 420 by means of a universal shaft 49 (Fig. 12) operating the beveled gear 470 at its upper end. This results in gradual movement of the carriage in one direction or the other, depending upon the direction of turn of the universal shaft 49. For turning the latter, a hand grip 50 is provided at the lower end of the shaft.

The carriage 37 has mounted thereon and movable transversely thereof, as seen in Figs. 2, 11 and 15, the whole mechanical unit or column structure employed for supporting each one of the cagelike stirrups 31, 32, 33 or 34, holding the projectors.

Each of these column structures comprises a mobile base 51, generally triangular in outline, as seen in Fig. 15, and provided at one side with a pair of rollers 52 riding on a rail 53 of the carriage 37. On the other side of the base 51, a single roller 54 similarly rides upon the opposite rail 55 of the carriage 37. The base 51 has secured upright thereon a housing 56 which is generally triangular in form and which comprises upper opening 57 and lower opening 58. This housing also is formed with vertical, outwardly projecting pairs of flanges 59 which have mounted thereon a set of upper rollers 60 projecting into the upper openings 57 and a set of lower rollers 61 projecting into the lower openings 58 of the housing 56. The latter is provided with a centrally apertured top 62 having a nut 63 thereon in registration therewith. The said nut is positioned within a circular flange 64 at the top of the housing which, likewise, receives the lower end of a cap member 65 forming the upper extremity of the housing.

A long threaded shaft 66 extends vertically through the housing 56, passing through apertured top 62 in threaded engagement with the nut 63. Surrounding the threaded shaft 66 interiorly of the housing 56 is a triangular hollow column 67 which at its upper end is secured to the shaft 66 by a connector 68. The three faces of the triangular casing 67 are, as seen more clearly in Fig. 15, contacted by the sets of rollers 60 and 61 respectively which insure true vertical reciprocation of the triangular casing 67, as will be further described.

The threaded shaft 66, as seen in Figs. 3 and 11, extends well below its supporting housing and carriage and substantially into the same plane with the tubular frame member 21 and 22. Shaft 66 has secured to its lower end a bearing sleeve 69 within which rests, as at 70, the lower end of a journal sleeve 71. Free rotary movement of this sleeve relative to the threaded shaft is provided for by means of a lower ball bearing 72 and an upper ball bearing 73 disposed between the sleeve 71 and a hub member 74. The latter, in turn, has secured thereto the hub 75 of the cage-like stirrup 31, 32, 33 or 34.

The means for effecting vertical or Z movement of the stirrup 31 through the medium of the long threaded shaft 66 will now be described.

The bearing sleeve 69 has depending therefrom a flexible shaft 76 adapted to be rotated on its longitudinal axis by a control knob 77 whereby the threaded shaft 66 is raised or lowered and similar movement imparted to the triangular casing 67 secured to the shaft. Downward movement of the shaft is limited by a pin 78 at the upper end of the shaft and upward movement of the said shaft is limited by contact of the connector 68 with the top portion 62 of the housing.

Each of the stirrups, such as 31, is also adapted for transverse movement relative to the machine as a whole, that is to say, the housing 56 on its base 51 can be moved back and forth on the rails of carriage 37. This is done by means of a threaded shaft 79 extending across and above the carriage 37 and at the center threadedly engaging the nut 80 secured to the base 51. (Figs. 11 and 15.) The ends of threaded shaft 79 are rotatably supported in upwardly projecting brackets 81 and 82 (Fig. 11), secured on opposite sides of the carriage 37. Each end of the shaft, as exemplified at the right side of Fig. 11, has a bevel gear 83 secured thereto and meshing with a companion gear 84 secured to the upper end of a flexible shaft 85 depending from the bracket 82. A suitable casing 86 encloses the gear unit just described, as seen at the left hand side of Fig. 11. The flexible shafts 85 terminate at the lower end in control knobs 87. Turning of either of these knobs will cause movement of the threaded shaft 79 through its nut 80 and consequent actuation of the carriage 51 and the whole structure support thereby. It will be understood that these movements are gradual and are utilized for procuring exact adjustments of the projectors into predetermined positions, as will likewise be further referred to.

The mounting and adjustment of the pairs of projectors in their supporting stirrups will now be detailed. As typical, reference will be made to the stirrup 31 and the projectors 1 and 2 associated therewith.

The base 88 of the stirrup is substantially rectangular (Fig. 4) and provided with curved ends 89 and 90. Within this base a similarly shaped frame or cradle 91 is positioned by means of a pair of pivot pins 92 (Fig. 6) positioned in the ends 89–90 of the stirrup base and projecting into the adjacently disposed ends of the cradle 91, roller bearings are employed with the pivot pin as will be noted in Fig. 6. The cradle is thus adapted for tilting movement with relation to the stirrup base and for accomplishing and controlling this movement. This tilt movement is necessary in order to adjust the device in use for deviation from parallel planes of the taking camera platen at successive camera stations. The tilt movement effected by means of a tilt screw 93 passing threadedly through an inturned flange 94 of the stirrup base and through a cylindrical nut 95 seated in a V-block 96 secured to said flange 94. The upper end of the tilt screw abuts against a lug 97 secured as at 98 to the cradle 91. When the tilt screw 93 is advanced upwardly by means of a thumb wheel 99, the cradle 91 is tilted in one direction against the spring action of a unit seen in Figs. 4 and 9. This unit comprises a vertical housing 100 screw threaded into the flange 94 of the stirrup base and having positioned therein a spring plunger unit 101, the upper end 102 of which abuts, through a ball bearing, against a lug 103 secured to the cradle 91. When the tilt screw 93 is retracted, the spring action just described moves the cradle 91 in the opposite direction. Locking of the tilted cradle 91 in a given position is accomplished by turning the thumb wheel 105 for actuating the tilt lock screw 106 threaded into the spring unit and bearing against the upper end thereof, thus limiting further compression of the spring unit. A set screw 104 passing through the small housing 100 engages the lower end of the spring unit to preclude rotation thereof relative to the housing. A rocker unit 107 is positioned within the cradle 91 by means of a pair of laterally positioned pivot pins 108 extending from the sides of the cradle into a pair of plates 110 secured on the side of rocker unit 107 by screws 111. The rocker unit is comprised of a pair of tracks 109 (Fig. 6) of arcuate formation as to the vertical plane. The function of the rocker unit is to adjust for deviation from parallel planes of the taking camera platen at successive camera stations. The tilting is accomplished by use of means most clearly indicated at the bottom of Fig. 6. At the top, the plate 110 is pivotally associated as at 112 with the adjacent portion of the cradle 91. At the lower end, the plate 110 is developed into a double socket 113. Into one of these sockets projects the end of a link 114 having a universal connection as at 115, with a threaded shaft 116 passing through a nut member 117 secured to cradle 91. The threaded shaft 116 is advanced and retracted by means of a knob 118. When the threaded shaft 116 is advanced, the rocker unit is tilted in a corresponding direction on its pivot 112 and against the spring action of a spring unit 119, the latter comprising a telescoping end section 120 projecting into the side of the double socket 113 opposite the link 114. The opposite end of the spring unit is supported by an extension 121 projecting downwardly from the cradle 91 and at its lower end threadedly receiving a lock screw 122 similar in form and function to the lock screw 106 previously described. This locking means provides for containing a rocker unit at a desired tilt. When the locking means is disengaged, and the knob 118 of the threaded shaft is retracted, the spring unit causes tilting movement of the rocker unit 91 in the opposite direction.

The projectors 1 and 2 (and similarly as to other projectors) are secured at the bottom on a projector base 123 (Figs. 4, 6 and 10). This base has parallel sides and curved ends and is provided with rollers 124 which ride on the arcuate tracks 109 of the rocker unit. The rollers are preferably mounted on eccentric shafts 125 (Fig. 6) and locked in aligned position by locking screw 126 and locking key 127. In Fig. 8 it will be seen that the projector base 123 is provided with a lateral downwardly projecting ball bearing 128 riding against the side of a groove 129 formed in each of the tracks 109 for assuring smooth, aligned movement of the projector base on the tracks.

The latter is locked in a selected position to rocker unit 107 by the means indicated in Fig. 7 which comprises a downwardly projecting plate 130 secured, as at 131, to the sides of the projector base. The lower end of the plate 130 is formed to provide a sleeve 132 for a spring plunger unit 133. This unit comprises a pair of spherical headed plungers 134 projecting endwise from the sleeve 132 and adapted to be constricted between a pair of blocking blocks 135 and 136, the former secured to the inner side of the rails 109 and the other extended endwise of the sleeve. The plungers 134 are adapted to be projected into their locking relationship by means of the spring 137 positioned inside the sleeve 132 and bearing against annular abutment rings 138 provided on the plungers. The latter are aligned by the tie rod 139. Each of the plungers is provided with a finger plate 140 mounted pivotally on pins 141 which pass through the plunger and are secured endwise in the sleeve 132. When the finger plates 140 are pressed toward one another, the pressure of the plungers 134 is released for permitting movement of the projector base 123 on its tracks. It will be noted in Fig. 2 that in the use of the machine the projector bases must be disposed in differing relationships, as will be further referred to.

The present invention, in addition to the various adjustment details already outlined, further provides for a limited swinging movement or rotation of the projector stirrups for adjusting the projectors in order to compensate for deviation from a straight line of an axis of the taking camera platen at successive camera stations. These adjustment means comprise an apertured lock plate 142 (Figs. 11 and 14) encircling the journal sleeve 71 on a bushing 143. This plate is radially split as at 144, and may be tightened into clamping relation by turning of a lock screw 145 projecting into a notch at the edge of plate 142. Swinging of the plate and consequently of the stirrup and its projectors, is provided by means of a control knob 146 (Fig. 11), which actuates the flexible shaft 147 and a pair of bevel gears 148–149 mounted in a housing 150 associated with the plate 142 and secured to the hub member 74, as at 151. The gears 148 and 148 actuate a screw 152 in housing 150. This screw actuates a contact sleeve 153 projecting from the housing 150 and adapted to impingement against a lug 154 secured to the plate 142. The plate is rotated to a corresponding extent, along with the hub member 74 and the stirrup fastened thereto, a movement provided for by virtue of the ball bearing relationship between journal sleeve 71 and hub member 74. Reversal of this movement is accomplished by a spring plunger unit 155 acting against the lug 154 on the side opposite the screw 152. The spring plunger unit 155 is also secured to the hub member 74.

It will be noted in Fig. 3 that the projectors 1 and 2 have each a base-projecting flange 156 and 157 extending into the projector base 123, to which flanges 156 and 157 are suitably and rigidly connected. Provision is made (Figs. 6 and 10) to align a nodal point of each projection lens so as to occupy the point of intersection of center lines between the two pairs of pivot pins 92 and 108, for purposes of calibration. This alignment means comprises holding pins 158 projecting inwardly of the projector base 123 at spaced intervals and bearing against the projector flanges 156 and 157. The pins 158 are secured in their given positions by means of set screws 159 (Fig. 10) extending into the top edge of a projector base 123. Angular adjustment of one projector relative to the other may be achieved by actuation of a threaded bolt 160 (Fig. 6), associated with the base flange 156 and 157 and seated in the end portion of projector base 123. By adjustment of these bolts 160, the projectors may be positioned within minute degrees for modifying their lens positions. Lock nut means are provided at 161 for maintaining the threaded bolts 160 in their selected positions.

Operation

The use of the machine above described will now be outlined. It may be repeated initially that an aerial photograph and the diapositive made therefrom do not in themselves constitute maps. These, due to variations in ground elevations, tilt of the camera and other phenomena, give a distorted picture of the terrain. Nor does a single aerial photograph afford means for measuring variations in ground elevation. The machine of this invention is utilized for converting the information contained in the photographs and the diapositives into accurate topographic maps.

The photographs necessary in the use of the stereoplotting instrument are obtained with a special type of twin-camera arrangement consisting of a pair of wide-angle precision aerial cameras coupled rigidly together so that, assuming no tilt, their respective optical axes lie in a common vertical plane and form an angle of 20°, more or less, with a plumb line and 40°, more or less, with each other. A single camera having twin lenses giving the same geometrical relationships can be substituted for the twin-camera arrangement. Orientation along the flight line gives the convergent low-oblique photography which is the basis of precision mapping. For a series of exposure stations, one of the two exposures at the first station will be converged with one of the two exposures at the second station. The second exposure at station 2 will be converged with one of the two exposures at station 3, and so on. It is these converging pairs of exposures from successive stations that overlap to form the stereoscopic models on the sheet 9 position on the work table 10.

Orientation of the taking camera transverse to the flight line is suitable for reconnaissance mapping at larger contour intervals. Each model in transverse orientation consists of all four exposures taken at two successive exposure stations, two at each station. A half model is formed by the overlap of the right hand exposure of station 1 with the right hand exposure of station 2, as seen by an observer facing in the direction of flight. Another half model is formed by the overlap of the left hand exposure of station 1 with the left hand exposure of station 2. Each of the two projectors of a pair, according to the present invention, is brought, in turn, into position for forming a model with the appropriate projector of an adjacent pair of projectors. Only one projector of a pair is in use at any one time, but the pair is so mounted that once either of the projectors has been oriented, the other can be brought into orientation by swinging it into a previously calibrated second position. This is the movement that is effected by shifting the projector base 123 and its projectors, along the tracks 109 of the rocker unit 107. Thus, for photography along the flight line, when compilation of the model formed by the converging pair from stations 1 and 2 has been completed, the pair of projectors at station 2 is swung into its second position. In this position, the projector that was not one of the convergent pair forming the first model is now oriented so that a correctly oriented second model can be formed by bringing the convergent projector at station 3 into relative orientation.

For transverse photography, when compilation of the half model formed by the right hand exposures of stations 1 and 2 is complete, both projector pairs are swung into the second position. In this position, the second half model formed by the left hand exposures of stations 1 and 2 is automatically oriented.

Calibration of the projectors for the use of photography taken by means of a given camera couple is achieved by utilizing the overlap in coverage between the two components of the coupled convergent low oblique cameras. This overlap, amounting to 0.6 times the flight height, more or less, affords an opportunity to recover the relative orientation of the coupled cameras in nature. The difference in X-, Y-, and Z-positions of the coupled camera stations in nature, at one exposure point, is negligible at practicable mapping scales, and has no effect on the calibration of the projectors; therefore, it is only necessary to calibrate the projectors with respect to angular orientations. The same X-, Y-, and Z-settings for the two projector stations of the couple are recovered by mechanical means. The angular calibration is checked by observing, at a series of different elevations, the position of a point as projected by one of the twin projectors as against its position as projected by the other projector. The rotational motions of each projector are manipulated until the projected positions of points remain the same for the two projectors, at any chosen elevation. This condition can exist only when the projectors are properly calibrated.

A fuller disclosure of operating details will now be given. With the proper diapositives inerted in their projectors and illuminated for creating a stereoscopic model, parallax in a direction perpendicular to the air base (i. e., in the Y direction) is removed at a point directly below the first projector unit by actuation of the control knob 146 of the second projector unit 32 (see Figs. 2 and 11). Similarly the Y parallax is removed at a point directly below the second projector unit by adjustment effected through actuation of the control knob 146 of the first projector unit. Removal of the Y parallax at a distant corner of the model area with respect to the air base is made by adjustment of the thumb wheel 99 for tilting the frame or cradle 91 (Fig. 6). The projector unit so adjusted is the one diagonally opposite the said point in the distant corner of the model area. In a similar manner, removal of the Y parallax is made in the adjacent corner of the model area on the same side of the air base by adjustment of the thumb wheel 99 of the projector unit diagonally opposite said point. The projector base 123 of the projector units is now removed to the second position by pressure on the finger plates 140, the projector bases being then locked into the adjacent position by the locking mechanism 134, Fig. 7 and related parts. The Y parallax, at a point midway between the two projectors near the extreme edge of the model area from the air base, is "overcorrected" by adjustment of the control knob 118 (see left hand side of Fig. 6), which pivotally actuates the rocker unit 107 on its pivot mountings 112. Projector bases 123 of both projector units are returned to the original position and the foregoing steps repeated until Y parallax is finally removed at all points. The observed parallax in a direction parallel to the air base (X parallax) must be removed for all observations during any orientation procedure by adjustment of the mapping datum 9.

Absolute orientation of the two projector units with respect to the datum plane is accomplished by trial and error procedures involving three operations: first, the orientation of the map base sheet for azimuth between one or more control points plotted on the base sheet and identifiable on the map datum through the projected images; second, adjustment for the scale of the model by actuation of the handgrip 50 (Fig. 12) to effect X motion (along the main rails 35–36) of either projector unit; third, by adjustment of the three support shafts 26, 28 and 29, or by simultaneous adjustment of the titlt controls 99 and 118 of both projectors, the former adjustment means being preferred.

After compilation of either half of the stereoscopic model has been effected, the projector bases 123 of both projector units are removed into the opposite position and compilation continued without further adjustments of the instrument.

This whole method of relative and absolute orientation and compilation of successive stereoscopic models is continued through the flight strip to complete the photogrammetric compilation of the map.

The procedure for orientation of stereoscopic models using convergent stereoscopic coverage is as follows: The Y parallax is first removed from the prospective stereoscopic model at a point directly below the first projector unit by adjustment of the control knob 146 of the second projector unit, that is, unit 32. Similarly, the Y parallax at a point directly below the second projector unit is removed by adjustment of the control knob 146 of the first projector unit. Removal of Y parallax at a corner of the model area is achieved by adjustment of the control knob 118 (Fig. 6), of the projector unit diagonally opposite said point. In a like manner, removal of Y parallax in the adjacent corner on the same side of the air base is effected by adjustment of the control knob 118 of the projector unit diagonally opposite the point. Thereafter, the Y parallax is overcorrected by the adjustment of the tilt control thumb wheel 99 of either projector. The foregoing steps are repeated until the Y parallax is removed at each of the points.

Absolute orientation of the projector units with respect to the datum plane is accomplished by trail and error in the same manner explained above.

Compilation of the stereoscopic model and orientation of the adjacent model are effected in the following manner. The projector base 123 of the second projector unit 32 is moved to the second position by finger pressure on the plates 140 (Figs. 4, 6 and 7), and locked in position by means already described. The projector is then illuminated and the image cast. The proper projector of the third projector unit is then positioned to afford a stereoscopic model. At a point directly below the third projector, the Y parallax is cleared by adjustment of the Y motion control knob 87 (Figs. 11 and 12) of the third projector unit. At a point directly below the second projector unit, the Y parallax is removed by actuation of the swing or rotary motion control knob 146 of the third projector unit. At a point near the corner of the model area opposite the third projector unit, Y parallax is removed by Z motion control knob 77 of the third projector unit. At a point near the corner of the model area opposite the third projector unit, on the opposite side of the air base, Y parallax is removed by overcorrection, using the tilt control knob 118 of the third projector unit. These steps are repeated until no residual Y parallax is observed at these points. Thereafter, at a point near the corner of the model area opposite the second projector unit, the Y parallax is cleared by adjustment of the tilt control knob 99 of the third projector unit. A point near the remaining unused corner is used as a check point.

Absolute orientation of the third projector unit is carried out by observation of a point which is common to the first model and the adjacent model. The measuring mark of the platen, P, is set at the elevation of this point as seen in the first model. The X motion of the third projector is adjusted by means of control knob 87 until the elevation of the point as observed in the second model is the same as in the first model, this elevation being indicated by the setting of the platen made in the first observation. Thereafter, the model may be compiled since no further horizontalizing is necessary.

This whole method of relative and absolute orientation and compilation of successive stereoscopic models is continued through the flight strip to complete the photogrammetric compilation of the map.

It will be appreciated from a reading of the foregoing specification that the invention herein described is susceptible of various changes and modifications without departing from the spirit and scope thereof.

What is claimed is:

1. A stereoscopic projection instrument for use in making maps from aerial photographs taken in simultaneous pairs at successive stations by a pair of rigidly-coupled cameras relatively inclined to each other at a fixed angle, the plane containing the optical axes of the two cameras being oriented optionally along the flight line when the photography is similarly taken and normal to the flight line when the photography is taken in this manner, the instrument comprising a map-holding table, a set of tracks above the table, a carriage movable on said tracks, a stirrup having a vertical axis mounted on said carriage for movement thereon transversely relative to said tracks, a projector unit comprising a pair of coupled projectors mounted on said stirrup with their projection axes at an angular relationship to each other corresponding to the relative angular inclination of the optical axes of the taking cameras, means for vertical and rotary adjustment of the stirrup relative to the table, means for actuating said carriage, base member and vertical and rotary adjustment to dispose the projector unit in predetermined position so as to duplicate the orientation of the taking cameras, and means for locking the projector unit in the adjusted position.

2. A stereoscopic projection instrument for use in making maps from aerial photographs taken in simultaneous pairs at successive stations by a pair of rigidly-coupled relatively-inclined cameras having a substantial overlap of photographic coverage at a single exposure station, the instrument comprising a map-holding table, a set of tracks above the table, a carriage movable on said tracks, a stirrup having a vertical axis mounted on said carriage for movement thereon transversely relative to said tracks, a projector unit comprising a pair of coupled projectors mounted on said stirrup with their projection axes at an angular relationship to each other corresponding to the relative angular inclination of the optical axes of the taking cameras, and adjusting devices for calibrating the orientation of the projectors of the pair relative to each other by utilizing said overlap of photographic coverage to recover the relative orientation of the coupled cameras in nature.

3. A stereoscopic projection instrument for use in making maps from aerial photographs taken in simultaneous pairs at successive stations by a pair of rigidly-coupled, relatively-inclined cameras oriented along the flight line, the instrument comprising a map holding table, a series of projector units positioned above the table, supporting means for adjustably holding each of said projector units in operative position relative to the table, further supporting means for each projector unit having a vertical rotation axis carried by said supporting means, each unit comprising a pair of coupled projectors mounted with their projection axes at an angular relationship to each other corresponding to the relative angular inclination of the optical axes of the taking cameras, and means for disposing a projector of each of two selected pairs of coupled projectors in the same relative position and angular inclination in space as the taking cameras and additional means for moving said projectors out of operative position and replacing them by and automatically orienting the other projector of each pair respectively for reproducing the relative position and angular inclination of the optical axes of the taking cameras at successive stations.

4. A stereoscopic projection instrument for use in making maps from aerial photographs taken in simultaneous pairs at successive stations by a pair of rigidly-coupled, relatively-inclined cameras oriented normal to the flight line, the instrument comprising a mapholding table, a series of projector units positioned above the table, each unit comprising a pair of coupled projectors mounted with their projection axes at an angular relationship corresponding to the relative angular inclination of the optical axes of the taking cameras, adjusting devices for disposing a projector of each of two selected pairs of coupled projectors in the same relative position and angular inclination as the position and angular inclination of the optical axes of the taking cameras, means for moving said projectors out of position and replacing them by the coupled projector of each pair respectively, means for adjusting the relative angular inclination of the optical axes of the two projector units to form a single continuous stereoscopic model composed of all four projected images, and means for adjusting the two projector units to give a four-projector model of the correct scale and in the correct relationship to the horizontal and vertical control points.

5. A stereoscopic projection instrument for accomplishing precise horizontal and vertical triangulation from aerial photographs taken in simultaneous pairs at successive stations by a pair of rigidly-coupled relatively-inclined cameras oriented along the flight line, the instrument comprising a map-holding table, a series of projector units positioned above the table, each unit comprising a pair of coupled projectors mounted with their projection axes at an angular relationship corresponding to the relative angular inclination of the optical axes of the taking cameras, adjusting devices for disposing a projector of each of two adjacent pairs in the same relative position and angular inclination in space as the optical axes in the taking cameras to form a stereoscopic model correctly oriented in relation to the map, means for moving the one projector of the second unit out of projecting position and replacing it by and orienting its other coupled projector, adjusting devices for correctly orienting a projector of a third projector unit relative to the oriented projector of the second unit, means for moving the oriented projector of the third unit out of projecting position and replacing it by and orienting its coupled projector, and in similar sequence until the aerial triangulation has been completed from one controlled area to another.

6. A stereoscopic projection instrument for accomplishing precise horizontal and vertical triangulation from aerial photographs taken in simultaneous pairs at successive stations by a pair of rigidly-coupled relatively-inclined cameras oriented normal to the flight line, the instrument comprising a map-holding table, a series of projector units positioned above the table, each unit comprising a pair of coupled projectors mounted with their projection axes at an angular relationship corresponding to the relative angular inclination of the optical axes of the taking cameras, adjusting devices for disposing a projector of each of two said pairs in the same relative position and angular inclination in space as the optical axes in the taking cameras, means for moving said one of the projectors of each of the two said pairs out of position and replacing them by the other coupled projector of each pair respectively, means for adjusting the two projector units to form a single continuous stereoscopic model composed of all four projector images, means for adjusting each of the two projector units to give a four-projector model of the correct scale and in the correct relationship to the horizontal and vertical control points, adjusting devices for correctly orienting a third projector unit relative to the second projector unit, a fourth projector unit relative to the third projector unit, and in similar sequence until the aerial triangulation has been completed from one controlled area to another.

7. In a stereoscopic projection instrument for use in making maps from aerial photographs taken in simultaneous pairs at successive stations, the two photographs of each pair being taken at an angle to one another from a fixed point in space, the combination of a map-holding table, a set of tracks above and parallel to the table, a series of stirrups mounted on and independently movable along said tracks, a series of pairs of projectors for projecting diapositives made from the photographs and corresponding respectively to the two photographic exposures made at a single camera station, means for mounting a pair of said projectors on a vertical axis on each of the stirrups for orientation along the flight line and to positions normal thereto, and means for joining each pair of projectors in operative relation for movement as a unit relative to another of the similar units whereby one projector of the one unit is adjustable relative to another projector of the other unit to obtain a stereoscopic projection on the mapping table.

8. In a stereoscopic projection instrument for use in making maps from aerial photographs taken in simultaneous pairs at successive stations, the two photographs of each pair being taken at an angle to one another from a fixed point in space, the combination of a map-holding table, a set of tracks above and parallel to the table, a series of stirrups mounted on and independently movable along said tracks, a series of pairs of projectors for projecting diapositives made from the photographs and corresponding respectively to the two photographic exposures made at a single camera station, means for mounting a pair of said projectors on a vertical axis on each of the stirrups for orientation along the flight line and to positions normal thereto, means for joining each pair of projectors in operative relation for movement as a unit relative to another of the similar units whereby one projector of the one unit is adjustable relative to another projector of the other unit to obtain a stereoscopic projection on the mapping table, and means for vertical and rotary adjustment of the projector units.

9. In a stereoscopic projection instrument for use in making maps from aerial photographs taken in simultaneous pairs at successive stations, the two photographs of each pair being taken at an angle to one another from a fixed point in space, the combination of a map-holding table, a set of tracks above and parallel to the table, a series of stirrups mounted on and independently movable along said tracks, a series of pairs of projectors for projecting diapositives made from the photographs and corresponding respectively to the two photographic exposures made at a single camera station, means for mounting a pair of said projectors on a vertical axis on each of the stirrups for orientation along the flight line and to positions normal thereto, means for joining each pair of projectors in operative relation for movement as a unit relative to another of the similar units whereby one projector of the one unit is adjustable relative to another projector of the other unit to obtain a stereoscopic projection on the mapping table, means for vertical and rotary adjustment of the projector units, and means for locking the units in adjusted position.

References Cited in the file of this patent

UNITED STATES PATENTS

| Number | Name | Date |
| --- | --- | --- |
| 1,955,116 | Duchatellier | Apr. 17, 1934 |
| 1,980,657 | Bauersfeld | Nov. 13, 1934 |
| 2,079,090 | Von Gruber | May 4, 1937 |
| 2,200,594 | Diggins et al. | May 14, 1940 |
| 2,451,031 | Kelsh | Oct. 12, 1948 |
| 2,461,567 | Pennington | Feb. 15, 1949 |
| 2,492,870 | Kelsh | Dec. 27, 1949 |
| 2,552,975 | Kelsh | May 15, 1951 |